US012720649B2

(12) United States Patent
Hume et al.

(10) Patent No.: US 12,720,649 B2
(45) Date of Patent: Aug. 25, 2026

(54) SENSOR FOR MEASUREMENTS OF THERMOPHYSICAL PROPERTIES

(71) Applicant: Thermtest Inc., Hanwell (CA)

(72) Inventors: Dale Hume, Fredericton (CA); Keegan Copage, Fredericton (CA); David Landry, Cumberland Bay (CA)

(73) Assignee: Thermtest Inc., Hanwell (CA)

(*) Notice: Subject to any disclaimer, the term of this patent is extended or adjusted under 35 U.S.C. 154(b) by 825 days.

(21) Appl. No.: 18/168,387

(22) Filed: Feb. 13, 2023

(65) Prior Publication Data

US 2023/0262851 A1 Aug. 17, 2023

Related U.S. Application Data

(60) Provisional application No. 63/310,634, filed on Feb. 16, 2022.

(51) Int. Cl.
*H05B 6/12* (2006.01)
*H05B 6/36* (2006.01)

(52) U.S. Cl.
CPC ........... *H05B 6/1281* (2013.01); *H05B 6/362* (2013.01)

(58) Field of Classification Search
CPC ........ B01J 19/0013; B01J 19/20; B01J 23/30; B01J 23/755; B01J 23/882; B01J 23/883; B01J 27/049; B01J 27/051; B01J 27/0515; B01J 35/51; B01J 35/55; B01J 35/615; B01J 35/633; B01J 35/635; B01J 37/20; B01J 8/0005; B01J 8/001; B01J 8/0025; B01J 8/005; B01J 8/082; B01J 8/087; B01J 8/10; B01J 8/16; B01J 8/24; C01B 17/162; Y02P 20/584; H05B 2203/003; H05B 2203/013; H05B 3/24; H05B 3/26; H05B 6/1281; H05B 6/362
USPC ............... 219/674, 672, 675, 676, 663, 665, 219/443.1–468.2, 509, 510, 518
See application file for complete search history.

(56) References Cited

U.S. PATENT DOCUMENTS

| | | | | |
|---|---|---|---|---|
| 6,552,307 B2 * | 4/2003 | Schilling | H05B 3/746 219/448.11 |
| 7,569,798 B2 * | 8/2009 | Thimm | H05B 3/746 219/460.1 |
| 2005/0002659 A1 * | 1/2005 | Panaghe | H05B 3/283 392/435 |

* cited by examiner

*Primary Examiner* — Quang T Van
(74) *Attorney, Agent, or Firm* — Shumaker & Sieffert, P.A.

(57) ABSTRACT

A sensor for measurements of thermophysical properties having an electrically conductive heating element provided in a circular shape on a base. The electrically conductive heating element is provided on the base in a pattern that is designed to better approximate a perfect circle so that the sensor better represents a circular solid disk source as described in the thermal equations used for measuring thermophysical properties, and thus requires a smaller empirical correction, improving the accuracy and certainty of measurements. The pattern of the electrically conductive heating element on the base is designed to optimize uniformity of heat distribution, thereby avoiding hot spots and, where hot spots are unable to be avoided, evenly distributes such hot spots.

20 Claims, 5 Drawing Sheets

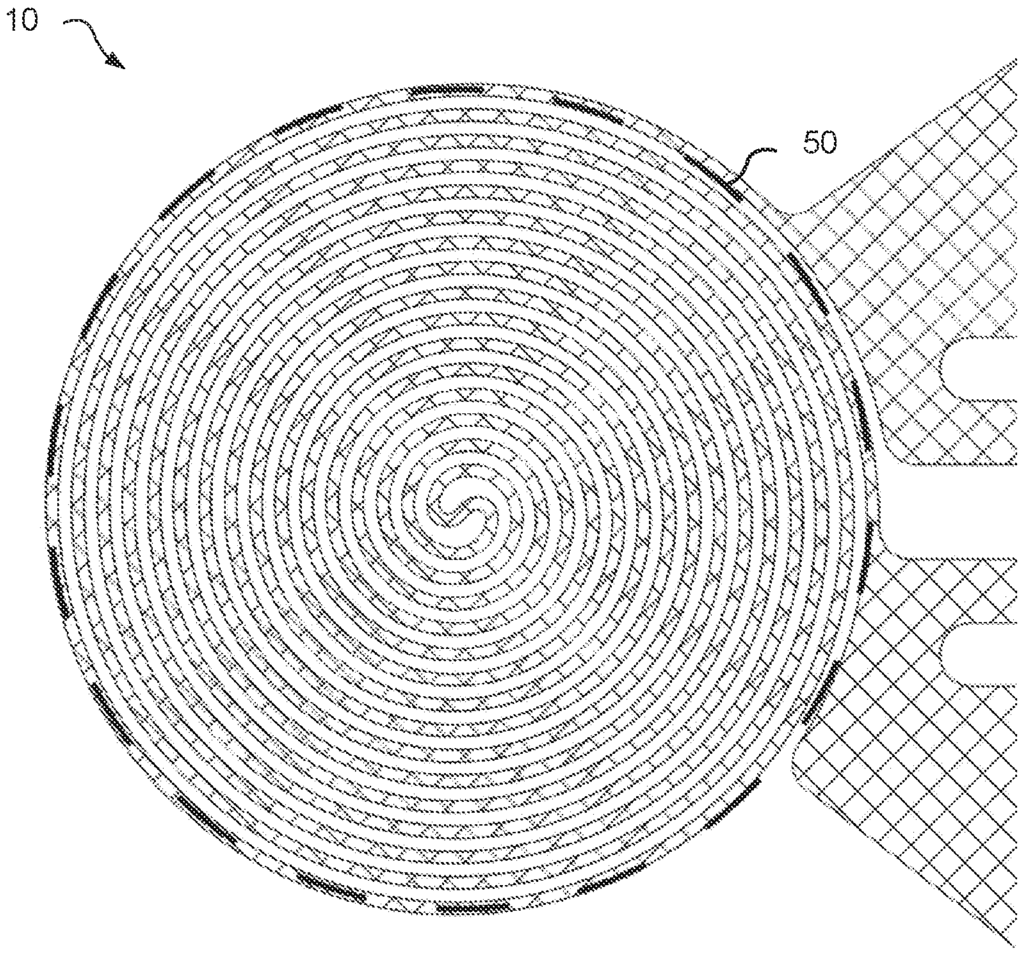
FIG. 5 – PRIOR ART

SENSOR FOR MEASUREMENTS OF THERMOPHYSICAL PROPERTIES

CROSS-REFERENCE TO RELATED APPLICATIONS

This application claims priority to U.S. Provisional Patent Application No. 63/310,634, filed on Feb. 16, 2022, the entire contents of which is incorporated by reference herein for all purposes.

TECHNICAL FIELD

The present disclosure relates to sensors, and in particular to sensors for measurements of thermophysical properties.

BACKGROUND

Current instrumentation for measurements of thermophysical properties include sensors with electrically conductive spiral or double spiral patterns. These sensors may in particular be used for transient measurements of thermal conductivity and diffusivity, where electricity is passed through the sensor to heat up a surrounding sample of material, and the sensor is used for recording the time-dependent temperature increase of the sample. The thermophysical properties of the sample are determined from the temperature data using thermal equations, which are a function of time, thermal conductivity, and thermal diffusivity. However, the thermal equations assume that the sensor is a circular solid disk source with a constant sensor radius. Since current sensor designs do not perfectly approximate a circular solid disk source and contain hot spot areas that skew measurements, empirical corrections for the sensors must be developed to achieve analytical expressions that match experimental results.

For example, spiral sensors have one electrical lead at the outer edge and one at the center. The center electrical lead must still reach the outer edge of the sensor and thus causes significant deviation from idealized heat models as well as asymmetry between the upper and lower sides of the sensor. Double spiral sensors have both electrical leads at the edge, but at smaller diameters in particular contain more deviation from a perfect circle and also have a hot spot located at the center of the sensor. For double spiral sensors, the correction factor is chiefly achieved by having a fictional radius. For example, the sensor may be used in a transient measurement of a material with a known thermal conductivity and thermal diffusivity, the measured temperature curve is fitted to the thermal equation, and a radial correction may be obtained by evaluating the square root of the ratio of the known thermal diffusivity to the measured thermal diffusivity. The corrected radius is then used in place of the nominal radius in the thermal equation when performing calculations. For spiral sensors, the corrections can be more involved.

In the field of measurements of thermophysical properties, calibrations and corrections add to the level of uncertainty of the measurement result. Equipment that requires a smaller correction thus improves the level of certainty. Accordingly, sensors for measurements of thermophysical properties that require smaller empirical corrections between analytical calculations and experimental results remain highly desirable.

BRIEF DESCRIPTION OF THE DRAWINGS

Features and advantages of the present disclosure will become apparent from the following detailed description, taken in combination with the appended drawings, in which:

FIG. 5 shows a representation of a 6.4 mm radius conventional double spiral sensor overlaid with its radial-corrected ideal circle.

It will be noted that throughout the appended drawings, like features are identified by like reference numerals.

DETAILED DESCRIPTION

Figure 1:
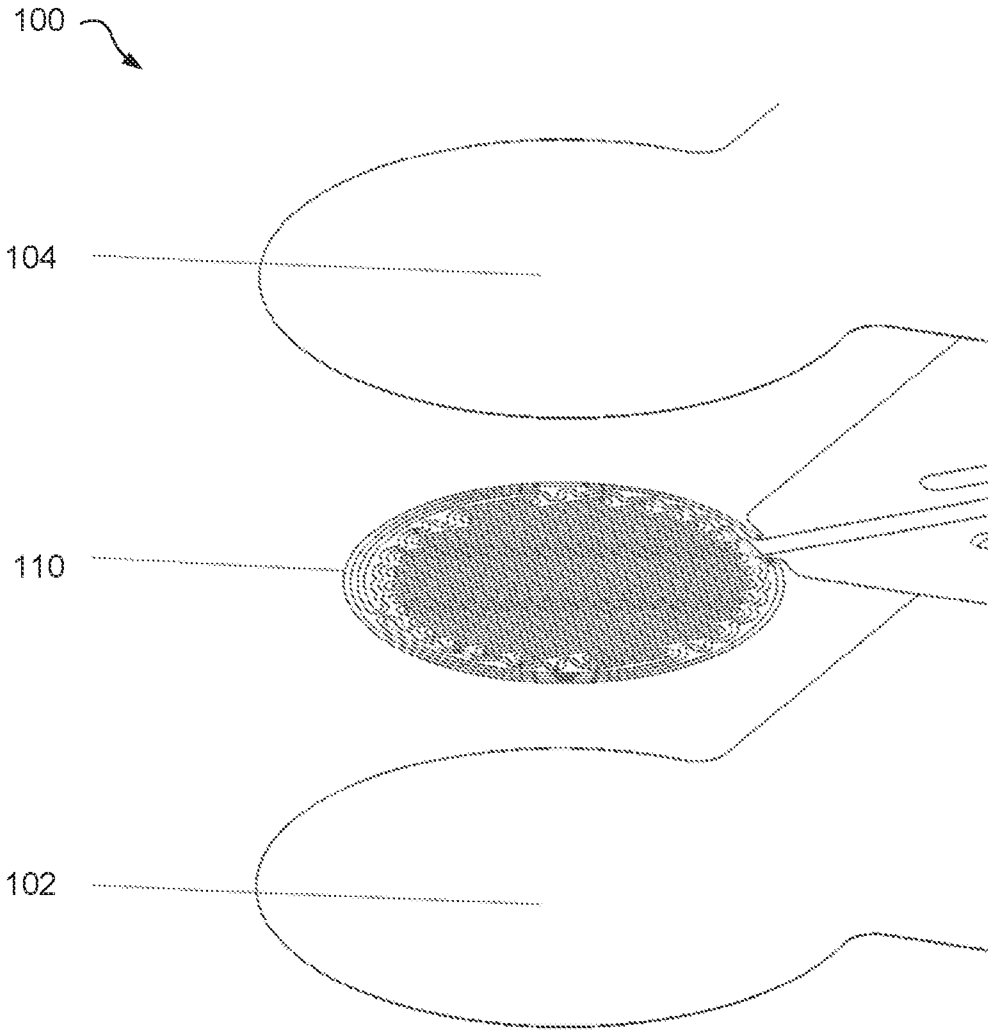
FIG. 1 shows a representation of a sensor for measuring thermophysical properties of a sample material in accordance with one aspect of the present disclosure.

In accordance with one aspect of the present disclosure, a sensor for measuring thermophysical properties of a sample material is disclosed, comprising: a base; and an electrically conductive heating element provided on the base to define a circular shape, the electrically conductive heating element provided on the base in a pattern that maximizes uniformity of heat distribution from the electrically conductive heating element.

In some aspects, the electrically conductive heating element comprises a plurality of adjacent traces, and wherein the uniformity of heat distribution from the electrically conductive heating element is maximized by minimizing a spacing between the plurality of adjacent traces.

In some aspects, a thickness of the electrically conductive heating element is optimized to minimize the thickness while maintaining a pre-defined sensor resistance.

In some aspects, the thickness of the electrically conductive heating element is substantially uniform.

In some aspects, a ratio of the electrically conductive heating element to a surface of the base is substantially uniform across the base.

In some aspects, the electrically conductive heating element comprises a circular striped portion defining a plurality of heating element strips spaced apart in a first direction and extending in parallel in a second direction perpendicular to the first direction, wherein interior heating element strips are each coupled to respective adjacent heating element strips at respective ends thereof.

In some aspects, the sensor further comprises first and second electrical leads coupled to the electrically conductive heating element, wherein first and second heating element strips at respective sides in the first direction are respectively coupled to the first and second electrical leads at first ends thereof and are each coupled to a respective adjacent heating element strip at second ends thereof.

In some aspects, the electrically conductive heating element further comprises an outer circular portion coupled to the first electrical lead, and wherein the first end of the first heating element strip is coupled to the outer circular portion.

In some aspects, the outer circular portion extends circumferentially around the circular striped portion, and defines a gap in proximity to the second electrical lead.

In some aspects, the electrically conductive heating element further comprises a first inner circular portion coupled between the first end of the first heating element strip and the outer circular portion.

In some aspects, the first inner circular portion has an oscillating shape to fill a space between a first subset of the plurality of heating element strips and the outer circular portion.

In some aspects, the electrically conductive heating element further comprises a second inner circular portion coupled to the second electrical lead, and wherein the first end of the second heating element strip is coupled to the second inner circular portion.

In some aspects, the second inner circular portion has an oscillating shape to fill a space between a second subset of the plurality of heating element strips and the outer circular portion.

In some aspects, the first electrical lead is disposed closer to the second heating element strip and the second electrical lead is disposed closer to the first heating element strip in the first direction.

In some aspects, the electrically conductive heating element is etched onto the base.

In some aspects, the electrically conductive heating element is made of nickel.

In some aspects, the electrically conductive heating element is made of platinum.

In some aspects, the base is made of an electrical insulating material.

In some aspects, the sensor further comprises a cover bonded to the base to secure the electrically conductive heating element in place.

In some aspects, the cover is made of an electrical insulating material.

In accordance with another aspect of the present disclosure, use of the sensor of any of the above aspects is disclosed for measuring thermophysical properties of a sample material.

The present disclosure provides a sensor for measurements of thermophysical properties having an electrically conductive heating element provided in a circular shape on a base. The electrically conductive heating element is provided on the base in a pattern that is designed to better approximate a perfect circle so that the sensor better represents a circular solid disk source as described in the thermal equations used for measuring thermophysical properties, and thus requires a smaller empirical correction, improving the accuracy and certainty of measurements. The pattern of the electrically conductive heating element on the base is designed to optimize uniformity of heat distribution, thereby avoiding hot spots and, where hot spots are unable to be avoided, evenly distributes such hot spots. In accordance with the present disclosure, the pattern of the electrically conductive heating element can be any pattern that provides an overall circular shape, and which increases the uniformity of heat distribution compared to existing sensor designs, which is achieved in part by: (i) keeping spacing between traces of the electrically conductive heating element as small as possible, as limited by manufacturers' minimum spacing capabilities, and (ii) optimizing the thickness of the electrically conductive heating element. The thickness of the electrically conductive heating element should be substantially uniform to produce the same amount of heat. By keeping spacing between traces of the electrically conductive heating element as small as possible, more of the electrically conductive heating element can be disposed on the base. Further, the pattern of the electrically conductive heating element should be designed so that a ratio of the electrically conductive heating element to a surface of the base is substantially uniform across the base.

In one particular aspect of the present disclosure, the electrically conductive heating element may define a circular striped portion, which has a striped pattern defining a plurality of heating element strips spaced apart in a first direction and extending in parallel in a second direction perpendicular to the first direction. First and second heating element strips at respective sides in the first direction are respectively coupled to first and second electrical leads at first ends thereof and are each coupled to a respective adjacent heating element strip at second ends thereof. Interior heating element strips are each coupled to respective adjacent heating element strips at respective ends thereof. The circular striped pattern of the electrically conductive heating element is one example of a pattern that maximizes uniformity of heat distribution from the electrically conductive heating element. Accordingly the sensor requires a smaller correction factor compared to other types of sensor designs in order to match the thermal equations being used in the measurement, and increases the level of certainty of the sensor measurements. The striped pattern of the electrically conductive heating element also helps to evenly distribute any local hotspots to around the edge of the sensor instead of at the center.

The sensor may be used as part of various equipment for performing measurements of thermophysical properties, including but not limited to transient measurements of thermal conductivity and diffusivity, determined for example using a transient plane source method.

Embodiments are described below, by way of example only, with reference to FIGS. 1-5.

FIG. 1 shows a representation of a sensor 100 for measuring thermophysical properties of a material in accordance with one aspect of the present disclosure. The sensor 100 comprises a base 102, a cover 104, and an electrically conductive heating element 110. FIG. 1 shows an exploded view of the sensor 100; when assembled, the electrically conductive heating element 110 is provided on the base (e.g. etched onto the base or otherwise placed onto the base), and the cover 104 is bonded to the base 102 to secure the electrically conductive heating element 110 in place. Bonding between the base 102 and cover 104 should be strong enough for them to be considered one element.

In use, the sensor 100 is inserted into a sample material for measuring thermophysical properties of the material. The sensor 100 acts as both a heating and a heat-sensing item. The electrically conductive heating element 110 is configured to conduct electricity, which heats up the sensor and the surrounding sample material. The resistance of the electrically conductive heating element 110 is related to the temperature of the surrounding sample material. The electrically conductive heating element 110 may be made of an electrically conductive metal, such as nickel or platinum. The base 102 and the cover 104 may be made of an electrical insulating material such as Kapton®, mica, or polyetheretherketone (PEEK). The base 102 and the cover 104 allow for the sample material to be heated by the electrically conductive heating element, while still providing a desired structural support for the electrically conductive heating element 110. Resistance recordings are taken during a measurement period for recording the time dependent temperature increase of the sample material. Electricity through the electrically conductive heating element is provided via electrical leads described in more detail herein below, and is controlled by a controller (not shown).

As described above, the electrically conductive heating element 110 is provided on the base 102 in a pattern that is designed to better approximate a perfect circle. Accordingly, the sensor better represents a circular solid disk source as described in the thermal equations used for measuring thermophysical properties, and the sensor thus requires a smaller empirical correction, improving the accuracy and certainty of measurements. The pattern of the electrically conductive heating element 110 on the base 102 is designed to optimize uniformity of heat distribution, thereby avoiding hot spots and, where hot spots are unable to be avoided, evenly distributes such hot spots. In accordance with the present disclosure, the pattern of the electrically conductive heating element 110 can be any pattern that provides an overall circular shape, and which increases the uniformity of heat distribution, which is achieved in part by: (i) keeping spacing between traces of the electrically conductive heating element as small as possible, as limited by manufacturers' minimum spacing capabilities, and (ii) optimizing the thickness of the electrically conductive heating element. By keeping spacing between traces as small as possible, the uniformity of heat distribution tends to increase because there are not large gaps or unfilled spaces between adjacent traces. Further, thinner traces of the electrically conductive heating elements allow one to create a more even heat distribution. However, thinner traces result in a higher sensor resistance, and the sensor resistance should generally be kept to within a range of around 1 ohm to 50 ohms for the measurement device to function well in practice.

Figure 2:
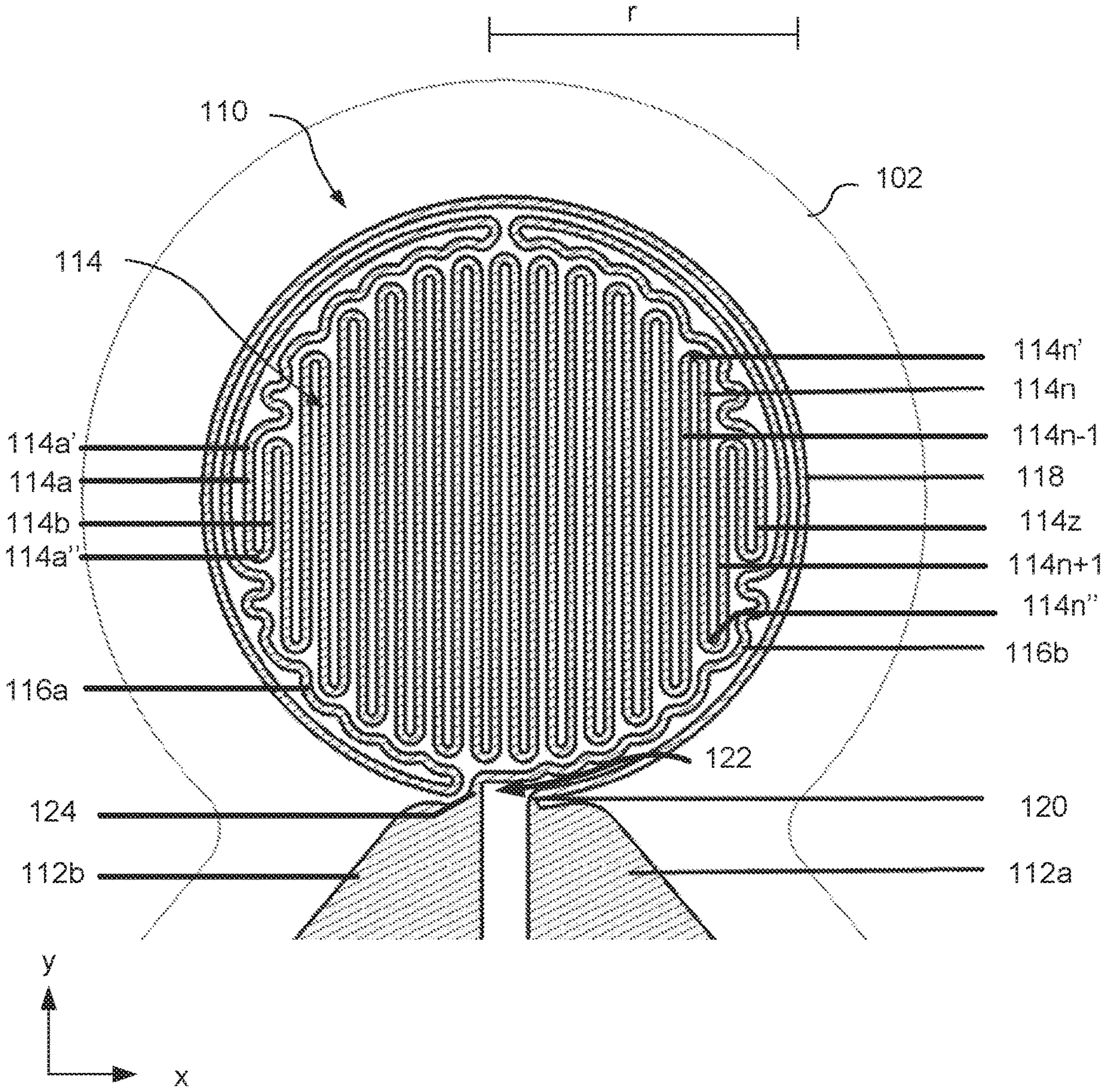
FIG. 2 shows a representation of the electrically conductive heating element in the sensor of FIG. 1.

Based on the foregoing, the electrically conductive heating element 110 can be provided to define a circular shape on the base 102 in various patterns or designs that maximizes uniformity of heat distribution from the electrically conductive heating element. FIG. 2 shows a representation of the electrically conductive heating element 110 in the sensor shown in FIG. 1, and represents one particular pattern of the electrically conductive heating element to define a circular shape on the base 102.

As seen in FIG. 2, the electrically conductive heating element 110 comprises a circular striped portion 114 coupled with electrical leads 112*a-b*. The circular striped portion 114 defines a striped arrangement of heating element strips, comprising a plurality of heating element strips spaced apart in a first direction (e.g. "x" direction) and extending in parallel in a second direction (e.g. "y" direction") perpendicular to the first direction. The lengths of heating element strips extending in the second direction varies, so that the plurality of heating element strips provide a circular shape. The spacing, thickness, and number of heating element strips in the first direction is set to minimize spacing between adjacent heating element strips and optimize thickness of the electrically conductive heating element 110 (i.e. minimum thickness without increasing the total resistance above a pre-defined value), thus maximizing uniformity of the heat distribution. While the "x" and "y" directions are shown relative to the sensor base 102 in FIG. 2, it would be appreciated that the "x" and "y" directions may be rotated within the plane of the base 102 so that instead of the heating element strips extending vertically as shown in FIG. 2, they may extend horizontally, or at angle.

The electrically conductive heating element 110 is a single continuous element, and the plurality of heating element strips in the circular striped portion 114 are defined by the electrically conductive heating element 110 and formed by 180 degree turns of the heating element at ends of each heating element strip. The striped portion 114 defines a plurality of interior heating element strips, e.g. interior heating element strip 114*n*. Each of the interior heating element strips are coupled to respective adjacent heating element strips at respective ends thereof. For example, interior heating element strip 114*n* is coupled to heating element strip 114*n*−1 at a first end 114*n*' thereof, and is coupled to heating element strip 114*n*+1 at a second end 114*n*" thereof.

Further, the heating element strips 114*a* and 114*z* at respective sides of the striped portion 114 in the first direction (i.e. the "x" direction in FIG. 2) are respectively coupled, directly or indirectly, to the first and second electrical leads 112*a* and 112*b* at first ends thereof and are each coupled to a respective adjacent heating element strip at second ends thereof. For example, the heating element strip 114*a* in FIG. 2 is indirectly coupled to the first electrical lead 112*a* at a first end 114*a*', and is coupled to adjacent heating element strip 114*b* at a second end 114*a*". Heating element strip 114*z* is similarly indirectly coupled to the second electrical lead 112*b* at one end thereof and an adjacent heating element strip at the other end thereof. Note that the first/second ends of the respective heating element strips 114*a* and 114*z* do not necessarily have to be the same. That is, in FIG. 2 the first ends of heating element strips 114*a* and 114*z* that are respectively coupled to the first and second electrical leads 112*a* and 112*b* are the same end in the "y" direction, however the ends of the heating element strips 114*a* and 114*z* that are coupled to the first and second electrical leads 112*a* and 112*b* could be opposite each other in the "y" direction, and depends on whether there is an even or odd number of the plurality of heating element strips.

The heating element strips 114*a* and 114*z* may be coupled directly or indirectly to the respective first and second electrical leads 112*a* and 112*b*. In the example shown in FIG. 2, the electrically conductive heating element 110 may comprise an outer circular portion 118 and first and second inner circular portions 116*a* and 116*b* disposed between the outer circular portion 118 and the circular striped portion 114.

The outer circular portion 118 may be coupled to the first electrical lead 112*a* at connection 120, and the first end 114*a*' of the heating element strip 114*a* is coupled to the outer circular portion 118. The outer circular portion 118 may extend circumferentially around the circular striped portion 114 and define a gap 122 that is in proximity to the second electrical lead 112*b*.

Note that in this design the first and second electrical leads 112*a* and 112*b* are disposed at opposite sides of the first and second heating element strips 114*a* and 114*z* in the first direction, with the first electrical lead 112*a* being disposed closer to the second heating element strip 114*z*, and the second electrical lead 112*b* being disposed closer to the first heating element strip 114*a*. That is, the first electrical lead 112*a* is disposed at the right-hand side in the x-direction, while the first heating element strip 114*a* coupled thereto is disposed at the left-hand side in the x-direction. Therefore, the outer circular portion 118, coupled to the first electrical lead 112*a*, is able to extend circumferentially around the circular striped portion 114 toward the first heating element strip 114*a*.

A first inner circular portion 116*a* may be coupled between the first end of the first heating element strip 114*a* and the outer circular portion 118. The first inner circular portion 116*a* is used to fill a space between a first subset of the plurality of heating element strips and the outer circular portion 118, and may have an oscillating shape to fill the empty space.

A second inner circular portion 116*b* may be coupled to the second electrical lead 112*b* at connection 124, and the first end of the second heating element strip 114*z* is coupled to the second electrical lead 112*b*. The second inner circular portion 116*b* may be disposed between the outer circular portion 118 and the circular striped portion 114, and extend through the gap 122 to connect to the second electrical lead 112*b* at connection 124. The second inner circular portion 116*b* may also have an oscillating shape to fill empty space between the outer circular portion 118 and a second subset of the plurality of heating element strips in the circular striped portion 114.

The sensor 100 as shown in FIGS. 1 and 2 thus comprises electrically conductive heating element 110 having a circular shape of radius "r", and better approximates a circular solid disk source than conventional sensors such as single or double spiral sensors. Accordingly, a smaller amount of correction is required for measurements of thermophysical properties, as described below.

Figure 3:
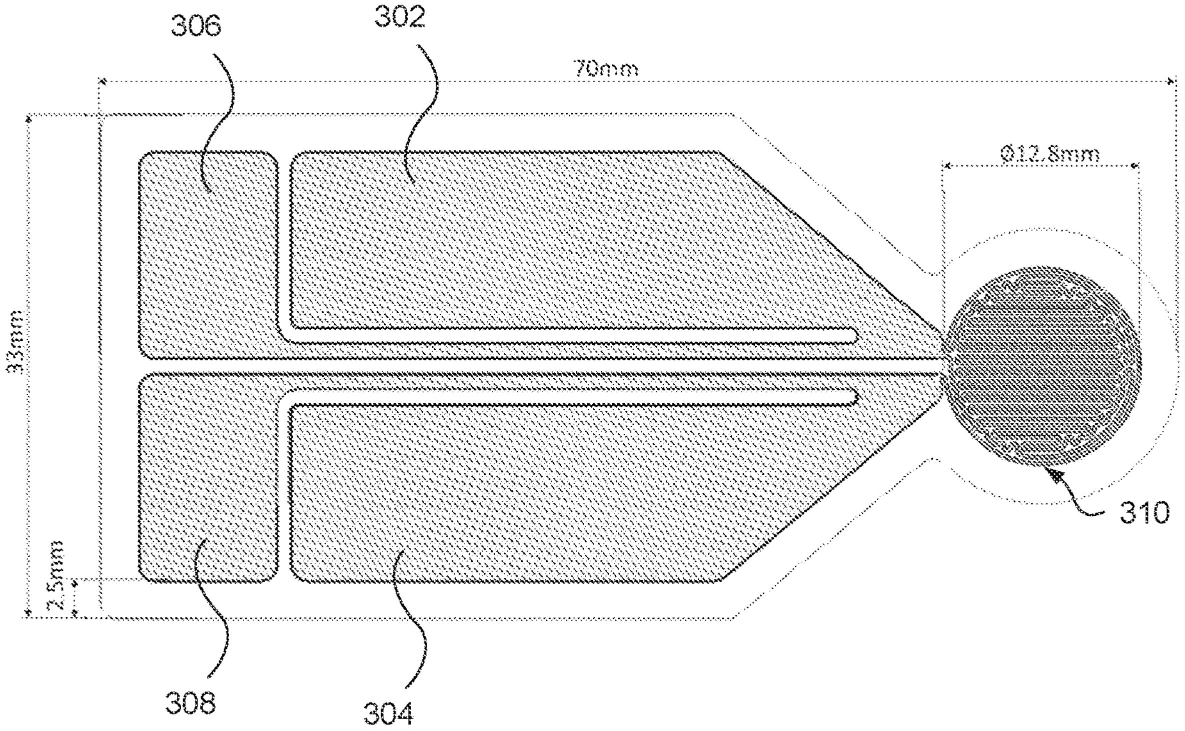
FIG. 3 shows an example of overall dimensions for a 6.4 mm radius sensor in accordance with the present disclosure.

FIG. 3 shows an example of overall dimensions for a 6.4 mm radius sensor in accordance with the present disclosure. The sensor comprises electrically conductive heating element 310 arranged in a pattern as described with reference to FIG. 2. Current flows to/from the electrically conductive heating element 310 defining the circular shape through pads 302 and 304, so the traces in these pads are wide and have low resistance. No significant current flows through the traces to pads 306 and 308, so these traces can be thin and more resistive. The conductive power traces carrying the current from the pads 302 and 304 to the electrically conductive heating element 310 defining the circular shape should be connected in a way that promotes uniform power dissipation within the circle while promoting a very low power dissipation in the trace that lies just outside the circle. The dimensions shown in FIG. 3 are provided for the sake of example only, and are non-limiting.

Figure 4:
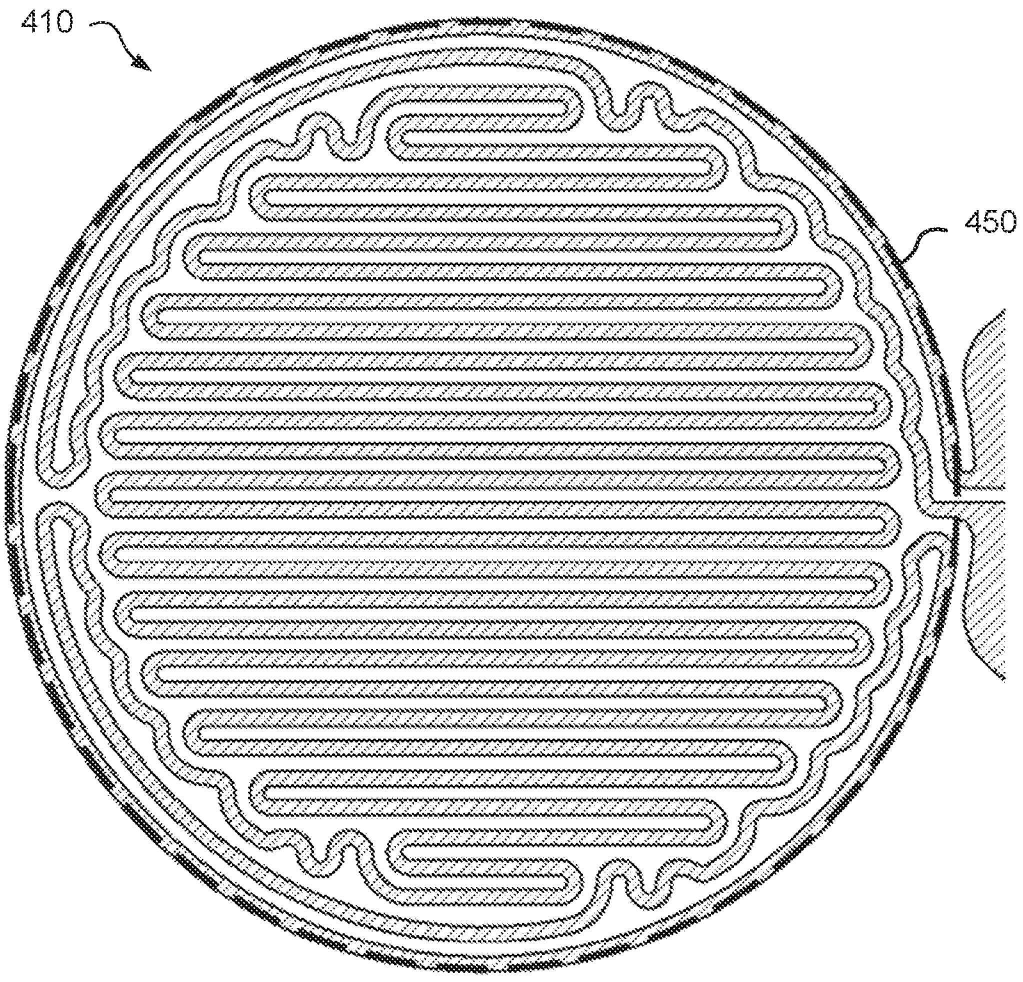
FIG. 4 shows a representation of a 6.4 mm radius sensor in accordance with the present disclosure overlaid with its radial-corrected ideal circle.

FIG. 4 shows a representation of a 6.4 mm radius sensor in accordance with the present disclosure overlaid with its radial-corrected ideal circle. Electrically conductive heating element 410 is arranged in a pattern as described with reference to FIG. 2, and radial-corrected ideal circle 450 is overlaid thereon for reference.

FIG. 5 shows a representation of a 6.4 mm radius conventional double spiral sensor overlaid with its radial-corrected ideal circle. The conventional sensor has an electrically conductive heating element 10 arranged in a double spiral pattern, and radial-corrected ideal circle 50 is overlaid thereon for reference.

As can be seen from FIGS. 4 and 5, the striped pattern of the electrically conductive heating element 410 in accordance with the present disclosure more closely corresponds to an ideal circle than the conventional double spiral pattern of electrically conductive heating element 10.

Table 1 shows correction factors and idealness for measuring thermal diffusivity of conventional double spiral sensors vs. a striped sensor as described with reference to FIG. 2 at different sensor radii.

TABLE 1

| Nominal | Correction Factor | | Idealness | |
|---|---|---|---|---|
| Sensor Radius (mm) | Double Spiral | Striped Sensor | Double Spiral | Striped Sensor |
| 2 | 1.035242291 | 1.013 | 96.48% | 98.70% |
| 3.2 | 1.018317293 | 1.0003125 | 98.17% | 99.97% |
| 6.4 | 1.015093177 | 1.00078125 | 98.49% | 99.92% |

The closer the correction factor is to 1.0 means the magnitude of correction is less, implying that the sensor performs well. The idealness percentage is a measurement of how close the effective sensor shape corresponds to an ideal circle in practice. As can be seen from Table 1, the striped sensor is more ideal and requires less correction than the double spiral sensor at the various radii. For example, a 3.2 mm radius sensor has a double spiral correction factor of ~1.8%, while the striped sensor has a ~0.03% correction factor for measuring thermal diffusivity. In the field of thermophysical properties, calibrations and corrections add to the level of uncertainty, and therefore a reduction of the required correction improves the certainty of the measurement method.

It would be appreciated by one of ordinary skill in the art that the system and components shown in the Figures may include components not shown in the drawings. For simplicity and clarity of the illustration, elements in the figures are not necessarily to scale, are only schematic and are non-limiting of the elements structures. It will be apparent to persons skilled in the art that a number of variations and modifications can be made without departing from the scope of the invention as described herein.

The invention claimed is:

1. A sensor for measuring thermophysical properties of a sample material, comprising:

a base; and an electrically conductive heating element provided on the base to define a circular shape, the electrically conductive heating element provided on the base in a pattern that maximizes uniformity of heat distribution from the electrically conductive heating element, wherein the electrically conductive heating element is configured to conduct electricity to heat up the sensor and the sample material, and wherein a resistance of the electrically conductive heating element is related to a temperature of the sample material.

2. The sensor of claim 1, wherein the electrically conductive heating element comprises a plurality of adjacent traces, and wherein the uniformity of heat distribution from the electrically conductive heating element is maximized by minimizing a spacing between the plurality of adjacent traces.

3. The sensor of claim 1, wherein a thickness of the electrically conductive heating element is optimized to minimize the thickness while maintaining a pre-defined sensor resistance.

4. The sensor of claim 3, wherein the thickness of the electrically conductive heating element is substantially uniform.

5. The sensor of claim 1, wherein a ratio of the electrically conductive heating element to a surface of the base is substantially uniform across the base.

6. The sensor of claim 1, wherein the electrically conductive heating element comprises a circular striped portion defining a plurality of heating element strips spaced apart in a first direction and extending in parallel in a second direction perpendicular to the first direction, wherein interior heating element strips are each coupled to respective adjacent heating element strips at respective ends thereof.

7. The sensor of claim 6, further comprising:

first and second electrical leads coupled to the electrically conductive heating element, wherein first and second heating element strips at respective sides in the first direction are respectively coupled to the first and second electrical leads at first ends thereof and are each coupled to a respective adjacent heating element strip at second ends thereof.

8. The sensor of claim 7, wherein the electrically conductive heating element further comprises an outer circular portion coupled to the first electrical lead, and wherein the first end of the first heating element strip is coupled to the outer circular portion.

9. The sensor of claim 8, wherein the outer circular portion extends circumferentially around the circular striped portion, and defines a gap in proximity to the second electrical lead.

10. The sensor of claim 8, wherein the electrically conductive heating element further comprises a first inner circular portion coupled between the first end of the first heating element strip and the outer circular portion.

11. The sensor of claim 10, wherein the first inner circular portion has an oscillating shape to fill a space between a first subset of the plurality of heating element strips and the outer circular portion.

12. The sensor of claim 8, wherein the electrically conductive heating element further comprises a second inner circular portion coupled to the second electrical lead, and wherein the first end of the second heating element strip is coupled to the second inner circular portion.

13. The sensor of claim 12, wherein the second inner circular portion has an oscillating shape to fill a space between a second subset of the plurality of heating element strips and the outer circular portion.

14. The sensor of claim 7, wherein the first electrical lead is disposed closer to the second heating element strip and the second electrical lead is disposed closer to the first heating element strip in the first direction.

15. The sensor of claim 1, wherein the electrically conductive heating element is etched onto the base.

16. The sensor of claim 1, wherein the electrically conductive heating element is made of nickel or platinum.

17. The sensor of claim 1, wherein the base is made of an electrical insulating material.

18. The sensor of claim 1, further comprising a cover bonded to the base to secure the electrically conductive heating element in place.

19. The sensor of claim 18, wherein the cover is made of an electrical insulating material.

20. Use of the sensor of claim 1 for measuring thermophysical properties of a sample material.

* * * * *